US012576775B2

(12) United States Patent
Schneider

(10) Patent No.: US 12,576,775 B2
(45) Date of Patent: Mar. 17, 2026

(54) METHOD FOR ADJUSTING A HEADLIGHT SYSTEM

(71) Applicant: MERCEDES-BENZ GROUP AG, Stuttgart (DE)

(72) Inventor: Christian Schneider, Radolfzell am Bodensee (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 320 days.

(21) Appl. No.: 18/564,230

(22) PCT Filed: Mar. 29, 2022

(86) PCT No.: PCT/EP2022/058287
§ 371 (c)(1),
(2) Date: Nov. 27, 2023

(87) PCT Pub. No.: WO2022/248105
PCT Pub. Date: Dec. 1, 2022

(65) Prior Publication Data
US 2024/0239261 A1 Jul. 18, 2024

(30) Foreign Application Priority Data

May 28, 2021 (DE) ..................... 10 2021 002 775.2

(51) Int. Cl.
*B60Q 1/08* (2006.01)
(52) U.S. Cl.
CPC ........ *B60Q 1/085* (2013.01); *B60Q 2300/324* (2013.01)
(58) Field of Classification Search
None
See application file for complete search history.

(56) References Cited

U.S. PATENT DOCUMENTS 6,130,506 A * 10/2000 Lopez .................. B60Q 1/1423
362/464
9,580,005 B2 2/2017 Foltin et al.
(Continued)

FOREIGN PATENT DOCUMENTS

DE 102009045321 A1 4/2011
DE 102014225513 A1 6/2016
(Continued)

OTHER PUBLICATIONS

International Search Report and Written Opinion mailed Jun. 21, 2022 in related/corresponding International Application No. PCT/EP2022/058287.
(Continued)

*Primary Examiner* — David P. Merlino
(74) *Attorney, Agent, or Firm* — PATENT PORTFOLIO BUILDERS PLLC

(57) ABSTRACT

A method for adjusting an automated headlight system of a motor vehicle, the headlight system having headlights for generating a low beam and a control device for adjusting a lower cut-off line of the low beam, involves calculating an elevation gradient from an extract from a digital elevation model, determining, from the elevation gradient, two turning points which are nearest ahead, determining and characterizing a mean path position on the basis of the turning points, and adjusting the lower cut-off line to a central point of the mean path position at least when the first turning point is reached.

10 Claims, 4 Drawing Sheets

(56)  References Cited

U.S. PATENT DOCUMENTS

| | | | |
|---|---|---|---|
| 10,988,075 B2 | 4/2021 | Mueller et al. | |
| 11,241,995 B2 | 2/2022 | Stratz et al. | |
| 2008/0262681 A1* | 10/2008 | Morishita | B60Q 1/12 |
| | | | 701/49 |
| 2015/0232017 A1 | 8/2015 | Ooishi et al. | |
| 2020/0156527 A1* | 5/2020 | Stratz | F21S 41/657 |
| 2021/0323466 A1* | 10/2021 | Chen | B60Q 1/115 |
| 2022/0324421 A1* | 10/2022 | Giovanardi | G08G 1/0145 |

FOREIGN PATENT DOCUMENTS

| | | | |
|---|---|---|---|
| DE | 102016004371 A1 | 2/2017 |
| DE | 102017005019 A1 | 11/2018 |
| DE | 102018100738 A1 | 7/2019 |
| DE | 102018219604 A1 | 5/2020 |
| EP | 3246206 A1 | 11/2017 |

OTHER PUBLICATIONS

Office Action created Jan. 25, 2022 in related/corresponding DE Application No. 10 2021 002 775.2.
Office Action dated Aug. 7, 2025 in related/corresponding KR Application No. 10-2023-7040165.

\* cited by examiner

METHOD FOR ADJUSTING A HEADLIGHT SYSTEM

BACKGROUND AND SUMMARY OF THE INVENTION

Exemplary embodiments of the invention relate to a method for adjusting an automated headlight system of a motor vehicle, wherein the headlight system has at least two headlights for generating a low beam and a control device for adjusting a lower cut-off line of the low beam, as well as to the automated headlight system for the motor vehicle.

In a modern motor vehicle, an automated or adaptive headlight system having headlights for generating a low beam can be and is often used. The headlight system can determine a course of the road by means of a camera-supported lane recognition, and adjust the low beam by means of a mechanism or a servomotor in the headlights to the course of the road based on the lane recognition. The headlight system is thus designed to be steered, and can adjust the low beam horizontally to the road. The low beam of the headlight can be adjusted vertically in the same way with the support of the camera by adjusting a light-dark boundary of the low beam to object limits—for example to vehicles ahead. Disadvantageously, a significant incline of the road cannot be recorded in this case. Thus, for example, the headlight system would light up the sky when driving over mountain peaks, because the camera cannot cover or detect the incline of the road.

Steering sensor-supported headlight systems are also known from the prior art. In the steering sensor-supported headlight system, the incline of the road is evaluated by a steering angle sensor in a steering column, and the headlight or the low beam is situationally adjusted. The steering sensor-supported headlight system does not enable predictive adjustment of the headlights, however, as an input of the steering angle sensor is necessary for adjustment. In addition, only the movement around the z axis of the motor vehicle is evaluated, and thus, no adjustment with regard to the pitching moment can be taken into account.

Headlight systems with a perceptive adjustment of the headlights are also known. Approaches to situational adjustment of the low beam to the incline of the road, which are for example supported by lane recognition or free space recognition, are known. Likewise, radar and lidar systems for adjusting the low beam to the incline of the road are also provided in currently used headlight systems. Here, sensors for determining the environment of the motor vehicle are used. Disadvantageously, however, the sensors cannot detect driving over a mountain peak due to their FOVs (FOV: field of view).

For example, DE 102018100738 A1 discloses a method in which the range of headlights is determined from a 3D profile of the road. The 3D profile is created with support from the vehicle, wherein patterns are projected onto the road with the headlights and are recorded with a camera. The 3D profile of the road ahead can be determined by distorting the pattern and the headlights can be correspondingly controlled.

DE 102018219604 A1 discloses a method in which headlights are vertically adjusted to the course of the road. Information about the road topography from a digital map is used for the adjustment. DE 102017005019 A1 discloses a method in which a pitching movement of the motor vehicle can be detected, and a change to a light-dark border thus caused can be compensated for. DE 102014225513 A1 discloses a method in which headlights are controlled depending on a calculated range of vision difference at a low beam and at a high beam. To calculate the range of vision difference, topography data can be used.

Exemplary embodiments of the invention thus an improved or at least alternative method for adjusting an automated headlight system and an improved or at least alternative embodiment of the automated headlight system, in which the disadvantages described are overcome.

A method according to the invention is provided for adjusting an automated headlight system of a motor vehicle. The headlight system has at least two headlights for generating a low beam and a control device for adjusting a lower cut-off line of the low beam. In the method, an elevation gradient of a route ahead of the motor vehicle is first calculated from an extract from a digital elevation model by means of mapping. In the method, two turning points that are nearest ahead, leading the motor vehicle to tip around the y axis of the motor vehicle, are then determined from the elevation gradient. In the method, a mean path position based on the two turning points which are nearest ahead is then determined and characterized. In the method, the lower cut-off line of the low beam of the headlight system is then adjusted to a central point of the mean path position at least when the first turning point ahead is reached.

In the method according to the invention, the digital elevation model (DEM) or a digital terrain model (DTM) is used. The headlights of the headlight system, and thus the low beam, can thus be predictively and situationally adjusted to the tipping of the motor vehicle around the y axis when passing the first turning point to be driven through. In particular, the elevation gradient and the mean path position can be calculated or determined in advance of reaching the first turning point to be driven through. The lower cut-off line of the low beam can consequently be quickly adjusted at least when reaching the first turning point ahead and the road ahead can be sufficiently lit when passing or when driving over the first turning point to be driven through. The turning point can, for example, be formed by a mountain peak or a mountain ridge or a mountain channel or a mountain summit.

Advantageously, in the method according to the invention, the digital elevation model or the digital terrain model (DTM) is used. The digital elevation model comprises data depicting a topography three-dimensionally and worldwide with a precision of to within 10 cm. The digital elevation model is generated cyclically—for example once a day—by satellite-supported systems. The method according to the invention can thus be used regardless of country. In addition, compared to conventional methods based on optical data recording, the method according to the invention is independent of weather and cloud-cover situations and generally of lighting conditions in the environment of the motor vehicle. In addition, the method is independent of calibration errors—e.g., extrinsic and/or intrinsic deviations in optical sensors—and requires no recalibration of the headlight system. The method according to the invention is additionally independent of the equipment of the motor vehicle and requires no specific set of sensors. In addition, the method according to the invention increases driving comfort and driving safety via a situational and predictive adjustment of the cut-off line of the low beam of the headlight system.

It can advantageously be provided that before the elevation gradient is calculated, the following steps are carried out in the following order: determining the digital elevation model of an environment of the motor vehicle; locating the motor vehicle in a superordinate coordinate system; and providing the extract from the digital elevation model of the environment of the motor vehicle relating to the route ahead of the motor vehicle. As already explained above, the digital elevation model or the digital terrain model is used in the method. It can advantageously be provided that, when locating the motor vehicle, said vehicle is located by means of an internal GPS system (GPS: Global Positioning System) and/or of a GCP system (GCP: Ground Control Point).

It can advantageously be provided that the digital elevation model is determined by means of a SAR measurement (SAR: Synthetic Aperture Radar). The method is thus independent of weather and cloud-cover situations and generally of lighting conditions in the environment of the motor vehicle.

It can advantageously be provided that when determining the mean path position, the latter is determined via an intersection point analysis. The mean path position can be determined as a continuous straight line through the two turning points that are nearest ahead. It can advantageously be provided that when characterizing the mean path position, an incline angle of the path position to the horizontal or to the vertical is determined. It can advantageously be provided that when adjusting the lower cut-off line of the low beam, the incline angle of the mean path position is transmitted to the control device of the headlight system.

It can advantageously be provided that the adjustment of the lower cut-off line of the low beam of the headlight system is undertaken depending on the incline angle chronologically before the first turning point to be driven through is reached or chronologically when the first turning point to be driven through is reached. For this purpose, a function graph can be provided, which adjusts the headlight of the headlight system, and thus the lower cut-off line of the low beam depending on the incline angle.

At a high incline angle, the motor vehicle is significantly tipped around the y axis when passing the first turning point to be driven through, and the headlights can be pre-conditioned or pre-aligned chronologically before the first turning point to be driven through is reached. The inertia of the mechanism of the headlights can thus be taken into account. The pre-conditioning or pre-alignment can be undertaken in a short period of time before the first turning point to be driven through is reached or passed in order not to negatively impair the lighting of the road before the first turning point to be driven through. At a low incline angle, the motor vehicle is tipped only slightly around the y axis when passing the first turning point to be driven through, and the headlights can be aligned accordingly as soon as the first turning point to be driven through is reached or passed. In other words, the pre-conditioning or the pre-alignment of the headlights is not required here.

It can advantageously be provided that when calculating the elevation gradient, a frequency for calculating the mean path position is determined from the latter. The calculation can be calculated depending on the change profile of the route ahead. If the route ahead has several turning points that cause tipping around the y axis, then the mean path position is calculated at a higher frequency. If the route ahead has fewer turning points that cause tipping around the y axis, then the mean path position is calculated at a lower frequency. This is the case, for example, if the route passes over a monotone or flat route. To determine the frequency, a Fourier transform of the elevation gradients can for example be used.

Exemplary embodiments of the invention also relate to an automated headlight system for a motor vehicle. The headlight system has at least two headlights for generating a low beam and a control device for adjusting a lower cut-off line of the low beam. According to the invention, the headlight system is designed to carry out the method described above.

Further important features and advantages of the invention result from the sub-claims, from the drawings and from the associated description of figures with reference to the drawings.

Naturally, the features specified above and which remain to be explained in the following can be used not only in the respectively specified combination, but also in other combinations or in isolation without leaving the scope of the present invention.

Preferred exemplary embodiments of the invention are represented in the drawings and are explained in more detail in the following description, wherein identical reference signs relate to identical or similar or functionally identical components.

BRIEF DESCRIPTION OF THE DRAWING FIGURES

Here, respectively schematically:

DETAILED DESCRIPTION

Figure 1:
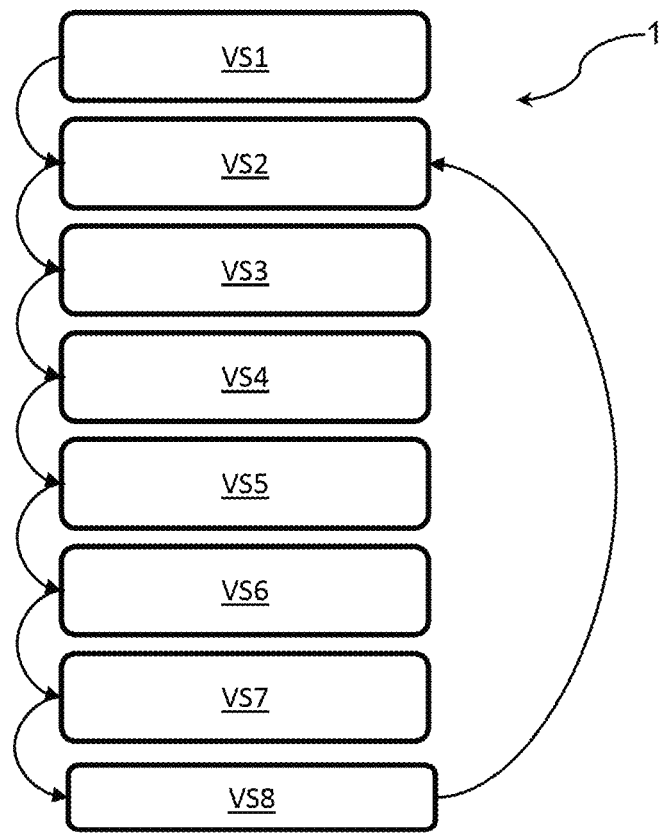
FIG. 1 shows a flow diagram of a method according to the invention.

FIG. 1 shows a flow diagram of a method 1 according to the invention. In FIGS. 2 to 7, individual steps of the method 1 are depicted. In the following, the individual steps of the method 1 and the depictions in FIG. 2 to FIG. 7 are explained in more detail.

With reference to FIG. 1, in a first step VS1 of the method 1, a digital elevation model 2 or a digital terrain model of an environment of a motor vehicle 3 is determined. The digital elevation model 2 is determined by means of an SAR measurement.

Figure 2:
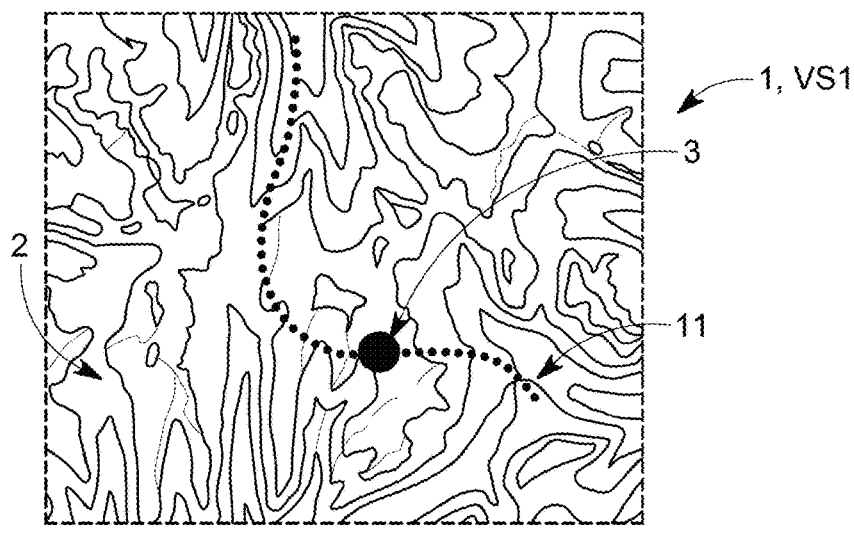
FIGS. 2 to 7 show depictions of individual steps in the method according to the invention.

With reference to FIG. 1 and FIG. 2, in a second step VS2 of the method 1, the motor vehicle 3 is located in a superordinate coordinate system. The motor vehicle 3 can be located by means of an internal GPS system and/or a GCP system.

Figure 3:
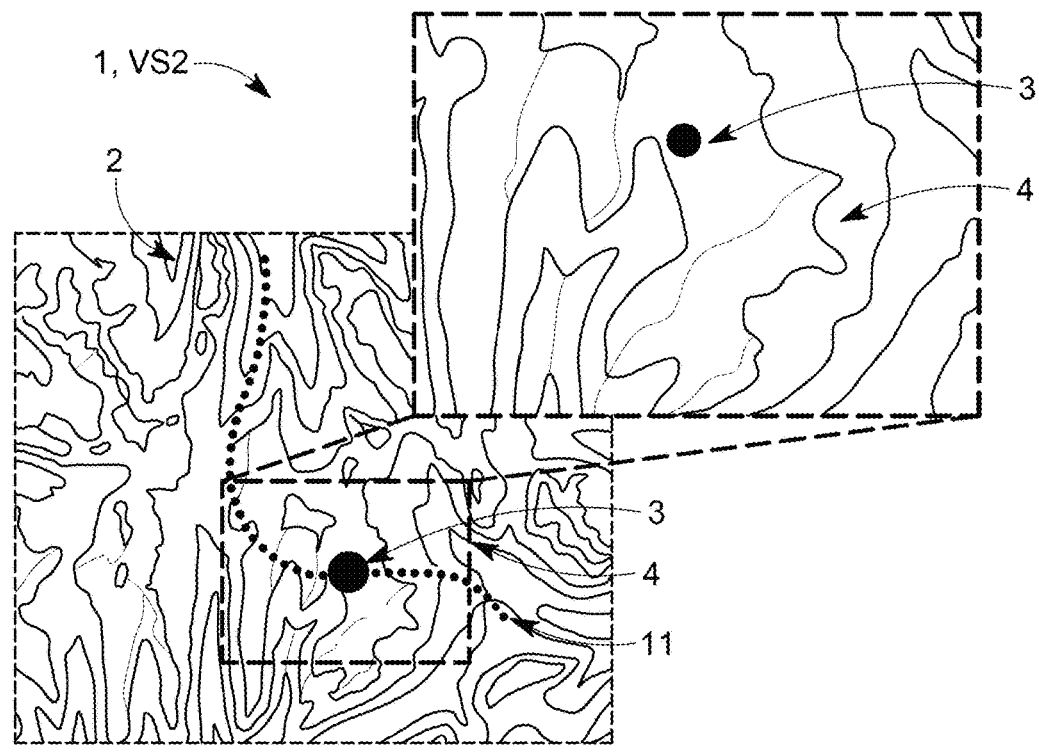

With reference to FIG. 1 and FIG. 3, in a third step VS3 of the method 1, an extract 4 from the digital elevation model 2 of the environment of the motor vehicle 3 relating to a route 11 ahead of the motor vehicle 3 is provided and downloaded.

Figure 4:
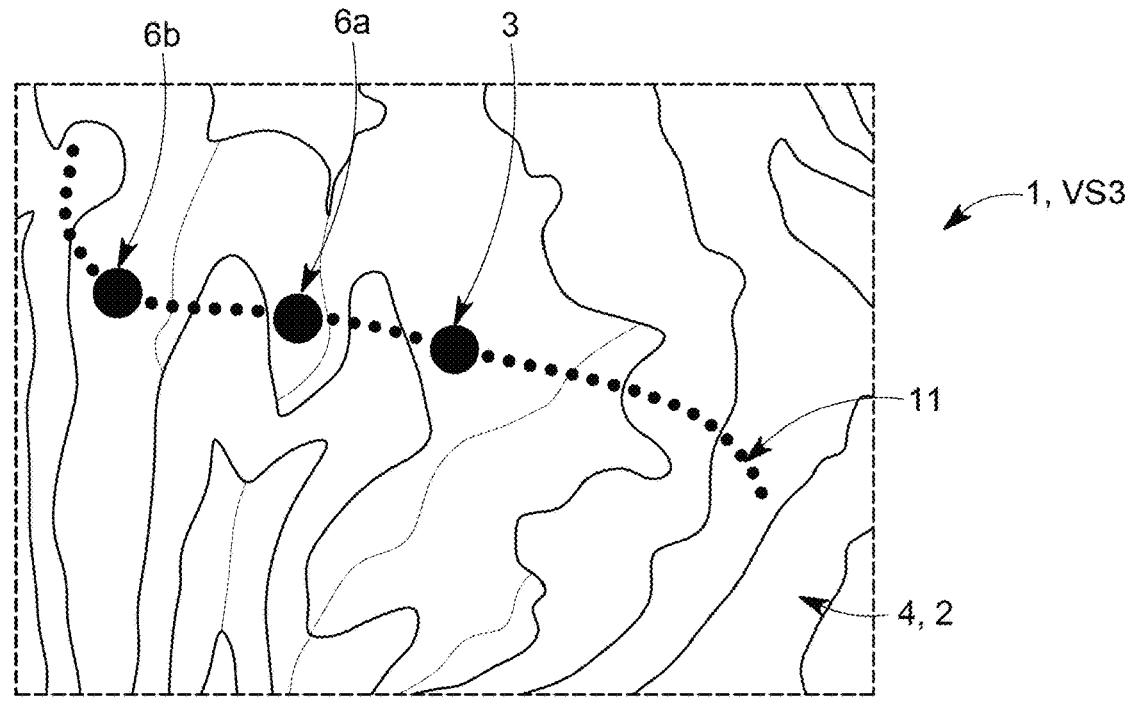
Figure 5:
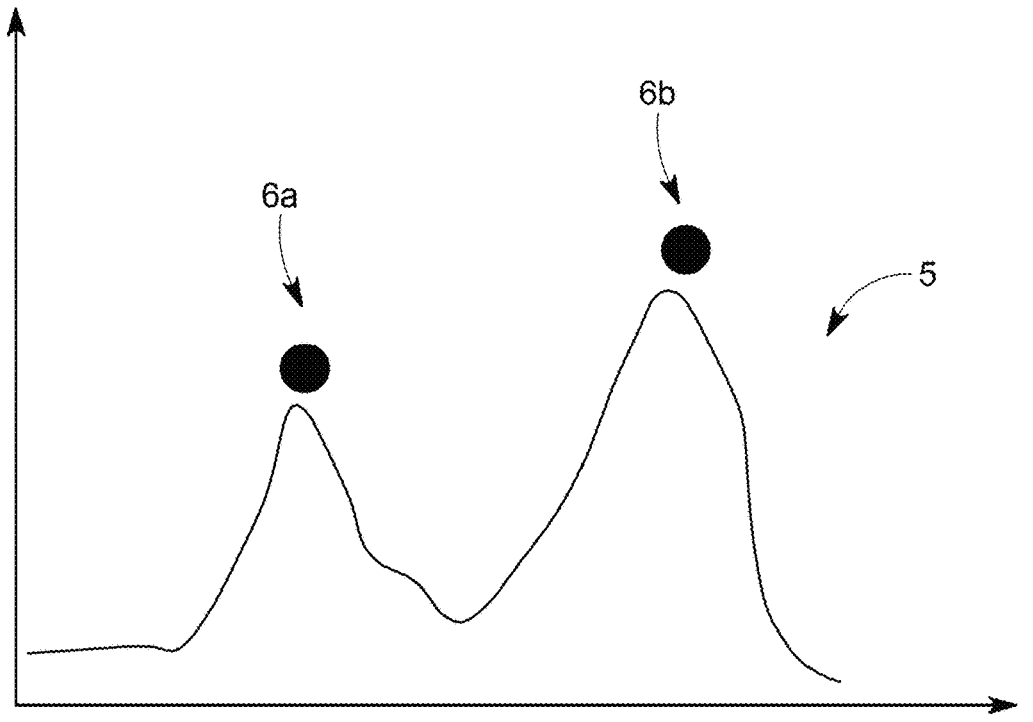

With reference to FIG. 1 and FIG. 4, in a fourth step VS4 of the method 1, an elevation gradient 5 of a route ahead of the motor vehicle 3 is calculated from the extract 4 from the digital elevation model 2 by means of mapping. In addition, in the fourth step VS4, two turning points 6a and 6b that are nearest ahead, leading the motor vehicle 3 to tip around the y axis of the motor vehicle 3, are then determined from the elevation gradient 5. In FIG. 5, the elevation gradient 5 calculated in step VS4 with the turning points 6a and 6b calculated in step VS4 is shown.

With reference to FIG. 1, in a fifth step VS5 of the method 1, a frequency for calculating a mean path position 7 is determined. The frequency can for example be implemented via a Fourier transform of the elevation gradient 5. If the route ahead has several turning points, then the mean path position 7 is re-calculated at a higher frequency. If the route ahead has just a few turning points, then the mean path position 7 is re-calculated at a lower frequency.

Figure 6:
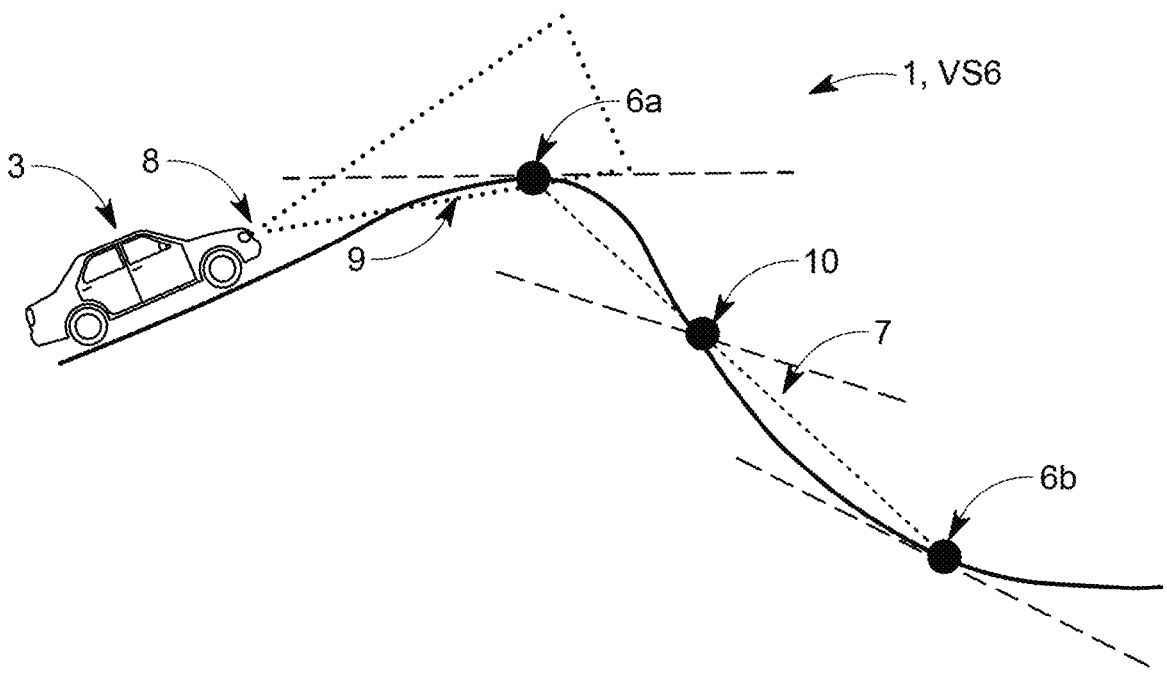

With reference to FIG. 1 and FIG. 6, in a sixth step VS6 of the method 1, the mean path position 7 is determined and characterized on the basis of the turning points 6a and 6b. The mean path position 7 can be determined via an intersection point analysis. The mean path position 7 can be determined as a continuous straight line through the turning points 6a and 6b. An incline angle of the mean path position 7 to the horizontal and a central point 10 is additionally calculated. The central point 10 can for example be calculated as an intersection point of the mean path position 7 and an actual path position or an actual road. As an alternative, the central point 10 can be established centrally between the two turning points 6a and 6b.

With reference to FIG. 1, in a seventh step VS7 of the method 1, the incline angle of the mean path position 7 is transmitted to a control device of a headlight system 8 of the motor vehicle 3.

Figure 7:
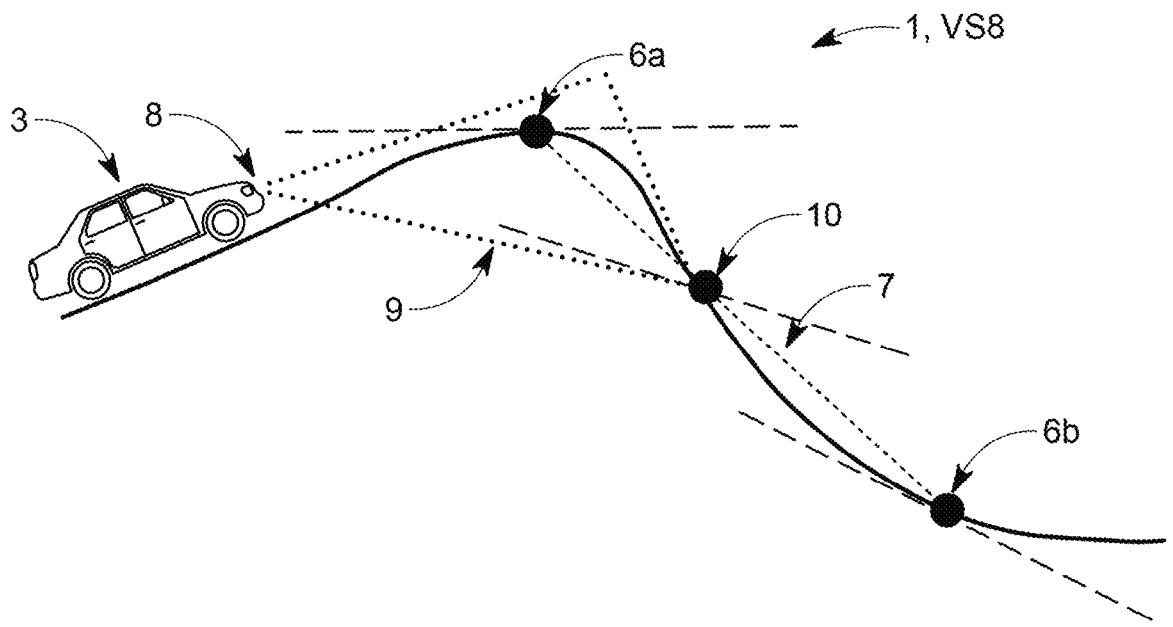

With reference to FIG. 1 and FIG. 7, in an eighth step VS8 of the method 1, a lower cut-off line 9 of a low beam of the headlight system 8 is adjusted to the central point 10 of the mean path position 7. The adjustment is implemented depending on the incline angle of the mean path position and, in this exemplary embodiment, in advance before the first turning point 6a ahead is reached.

With reference to FIG. 1, in the method 1, the second step VS2 is carried out after the eighth step VS8. The speed of the transition to the second step VS2 after the eighth step VS8 is determined by the frequency from the fifth step VS5.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for adjusting an automated headlight system of a motor vehicle, wherein the headlight system has at least two headlights that generate a low beam and a control device configured to adjust a lower cut-off line of the low beam, the method comprising the following steps in the following order:
   A. calculating an elevation gradient of a route ahead of the motor vehicle from an extract from a digital elevation model;
   B. determining, from the calculated elevation gradient, two turning points that are nearest ahead and leading the motor vehicle to tip around a y axis of the motor vehicle;

C. determining and characterizing a mean path position based on the two turning points nearest ahead; and
   D. adjusting the lower cut-off line of the low beam of the headlight system to a central point of the mean path position at least when the vehicle reaches a first one of the two turning points nearest ahead.

2. The method of claim 1, wherein prior to the calculation of the elevation gradient, the following steps are carried out in the following order:
   determining the digital elevation model of an environment of the motor vehicle;
   locating the motor vehicle in a superordinate coordinate system; and
   providing the extract from the digital elevation model of the environment of the motor vehicle relating to the route ahead of the motor vehicle.

3. The method of claim 2, wherein the motor vehicle is located by an internal GPS system or a ground point control system.

4. The method of claim 2, wherein the digital elevation model is determined using a synthetic aperture radar measurement.

5. The method of claim 1, wherein the mean path position is determined via an intersection point analysis.

6. The method of claim 1, wherein when characterizing the mean path position, an incline angle of the path position to horizontal or to vertical is determined.

7. The method of claim 6, wherein when adjusting the lower cut-off line of the low beam, the incline angle of the mean path position is transmitted to the control device of the headlight system.

8. The method of claim 6, wherein the lower cut-off line of the low beam of the headlight system is adjusted depending on the incline angle chronologically before a first one of the two turning points to be driven through is reached or chronologically when the first one of the two turning points to be driven through is reached.

9. The method of claim 1, wherein when calculating the elevation gradient, a frequency for calculating the mean path position is determined from the mean path position.

10. An automated headlight system for a motor vehicle, wherein the automated headlight system comprises:
   at least two headlights configured to generate a low beam; and
   a control device configured to adjust a lower cut-off line of the low beam,
   wherein the automated headlight system is configured to
      first calculate an elevation gradient of a route ahead of the motor vehicle from an extract from a digital elevation model;
      second determine, from the calculated elevation gradient, two turning points that are nearest ahead and leading the motor vehicle to tip around a y axis of the motor vehicle;
      third determine and characterize a mean path position based on the two turning points nearest ahead; and
      fourth adjust the lower cut-off line of the low beam of the headlight system to a central point of the mean path position at least when the vehicle reaches a first one of the two turning points nearest ahead.

* * * * *